(12) United States Patent
Fan (10) Patent No.: US 11,132,526 B2
(45) Date of Patent: Sep. 28, 2021

(54) FINGERPRINT RECOGNITION PANEL, FINGERPRINT RECOGNITION METHOD AND DISPLAY DEVICE

(71) Applicant: BOE TECHNOLOGY GROUP CO., LTD., Beijing (CN)

(72) Inventor: Xing Fan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 16 days.

(21) Appl. No.: 16/490,367

(22) PCT Filed: Feb. 1, 2019

(86) PCT No.: PCT/CN2019/074438
§ 371 (c)(1),
(2) Date: Aug. 30, 2019

(87) PCT Pub. No.: WO2019/205772
PCT Pub. Date: Oct. 31, 2019

(65) Prior Publication Data
US 2021/0012080 A1    Jan. 14, 2021

(30) Foreign Application Priority Data
Apr. 28, 2018 (CN) .......................... 201810400597.7

(51) Int. Cl.
*G06K 9/00* (2006.01)
*G06F 3/041* (2006.01)
(Continued)

(52) U.S. Cl.
CPC ......... *G06K 9/0004* (2013.01); *G06F 3/0416* (2013.01); *G06K 9/2027* (2013.01);
(Continued)

(58) Field of Classification Search
CPC .. G06K 9/0004; G06K 9/2027; G06F 3/0416; G09G 3/2003; G09G 5/10;
(Continued)

(56) References Cited

U.S. PATENT DOCUMENTS

| 10,157,590 B1* | 12/2018 | Aflatooni ........... G06K 9/00013 |
| 2017/0315405 A1* | 11/2017 | Masuda ................... C09B 11/04 |
| 2019/0278967 A1* | 9/2019 | Shepelev ................. G09G 3/32 |

FOREIGN PATENT DOCUMENTS

| CN | 107295195 A | 10/2017 |
| CN | 107657238 A | 2/2018 |

(Continued)

OTHER PUBLICATIONS

International Search Report and Written Opinion dated Apr. 17, 2019, from application No. PCT/CN2019/074438.
(Continued)

*Primary Examiner* — Charles V Hicks
(74) *Attorney, Agent, or Firm* — Arch & Lake LLP (57) ABSTRACT

The present disclosure relates to the field of display, and provides a fingerprint recognition panel, a fingerprint recognition method, and a display device. The fingerprint recognition panel includes: a touch screen including at least one fingerprint pressing area; and a sensor located below the touch screen, configured to send a driving signal to the touch screen when a press is detected in the fingerprint pressing area, to increase brightness of a pixel corresponding to the fingerprint pressing area in the touch screen.

9 Claims, 5 Drawing Sheets

(51) Int. Cl.
*G06K 9/20* (2006.01)
*G09G 3/20* (2006.01)
*G09G 5/10* (2006.01)

(52) U.S. Cl.
CPC ............. *G09G 3/2003* (2013.01); *G09G 5/10* (2013.01); *G09G 2300/0452* (2013.01); *G09G 2320/045* (2013.01); *G09G 2320/0686* (2013.01)

(58) Field of Classification Search
CPC ..... G09G 2300/0452; G09G 2320/045; G09G 2320/0686
See application file for complete search history.

(56) References Cited

FOREIGN PATENT DOCUMENTS

| | | |
|---|---|---|
| CN | 108596124 A | 9/2018 |
| CN | 208044629 U | 11/2018 |
| CN | 107295195 B | 1/2019 |

OTHER PUBLICATIONS

Yuan, Yang, "Samsung Won the Patent of Fingerprint Recognition Under Screen: Support Pressure Sensing", Oct. 27, 2017 (5p).

\* cited by examiner

FINGERPRINT RECOGNITION PANEL, FINGERPRINT RECOGNITION METHOD AND DISPLAY DEVICE

CROSS-REFERENCE TO RELATED APPLICATIONS

The present application is based upon International Application No. PCT/CN2019/074438, filed on Feb. 1, 2019, which is based upon and claims the priority to the Chinese Patent Application NO. 201810400597.7, filed on Apr. 28, 2018, the entire contents of which are hereby incorporated by reference.

TECHNICAL FIELD

The present disclosure relates to the field of display, and in particular, to a fingerprint recognition panel, a method for recognizing a fingerprint using a fingerprint recognition panel, and a display device including the fingerprint recognition panel.

BACKGROUND

Fingerprint recognition refers to identity authentication by comparing the detailed features of different fingerprints. Since people have different fingerprints, and there is a clear difference between the ten fingers of the same person, so the fingerprint can be used for identification.

At present, fingerprint recognition is mainly implemented in the form of capacitive type, optical type, thermal type and ultrasonic type. In mobile phones, tablet computers and other electronic devices, compact and low-cost capacitive modules have gradually become a first choice of most consumer electronics manufacturers.

It should be noted that the information disclosed in the Background section above is only for enhancing the understanding of the background of the present disclosure, and thus may include information that does not constitute prior art known to those of ordinary skill in the art.

SUMMARY

The present disclosure provides a fingerprint recognition panel, a fingerprint recognition method, and a display device.

According to a first aspect of the present disclosure, a fingerprint recognition panel is provided. The fingerprint recognition panel includes a touch screen including at least one fingerprint pressing area. The fingerprint recognition panel includes a sensor located below the touch screen. The sensor is configured to send a driving signal to the touch screen when a press is detected in the fingerprint pressing area, to increase brightness of a pixel corresponding to the fingerprint pressing area in the touch screen.

In an example arrangement of the present disclosure, the touch screen includes a screen layer and a pixel layer, and the pixel layer is located between the screen layer and the sensor.

In an example arrangement of the present disclosure, the pixel layer includes a fingerprint recognition pixel and an image display pixel, and the fingerprint recognition pixel is disposed corresponding to the fingerprint pressing area.

In an example arrangement of the present disclosure, increasing brightness of the pixel includes increasing a gray level of at least a portion of sub-pixels included in the pixel.

In an example arrangement of the present disclosure, increasing brightness of the pixel includes changing a color displayed by the pixel.

In an example arrangement of the present disclosure, changing a color displayed by the pixel includes changing the color displayed by the pixel to display white color in the fingerprint pressing area.

In an example arrangement of the present disclosure, changing a color displayed by the pixel includes changing the color displayed by the pixel, so that a blue sub-pixel of the pixel does not emit light.

In an example arrangement of the present disclosure, the fingerprint recognition pixel is configured to emit light when a corresponding fingerprint pressing area is pressed.

In an example arrangement of the present disclosure, the fingerprint recognition pixel is a green sub-pixel.

In an example arrangement of the present disclosure, the image display pixel includes red, green, and blue sub-pixels arranged in sequence. The red, green, and blue sub-pixels and the fingerprint recognition pixel constitute a pixel unit, and a plurality of the pixel units are arranged in array.

In an example arrangement of the present disclosure, the fingerprint recognition pixel is one or more of the red, green, and blue sub-pixels.

In an example arrangement of the present disclosure, the fingerprint recognition pixel is located on a side of the image display pixel and is coaxially arranged with sub-pixels of same color of the image display pixel.

In an example arrangement of the present disclosure, the fingerprint recognition pixel is nested in the image display pixel and is coaxially arranged with sub-pixels of same color of the image display pixel.

In an example arrangement of the present disclosure, the image display pixel includes red, green, and blue sub-pixels arranged in sequence. Adjacent image display pixels share one sub-pixel. The fingerprint recognition pixel is nested in the image display pixel, and is arranged coaxially with sub-pixels of same color of the image display pixels.

According to a second aspect of the present disclosure, a fingerprint recognition method is provided. The method includes:

detecting, by a sensor, whether at least one fingerprint pressing area of a touch screen is pressed; and sending, by the sensor, a driving signal to the touch screen when the fingerprint pressing area is pressed, to increase brightness of a pixel corresponding to the fingerprint pressing area in the touch screen to recognize the fingerprint.

In an example arrangement of the present disclosure, the touch screen includes a screen layer and a pixel layer, and the pixel layer is located between the screen layer and the sensor.

In an example arrangement of the present disclosure, the pixel layer includes a fingerprint recognition pixel and an image display pixel, and the fingerprint recognition pixel is disposed corresponding to the fingerprint pressing area.

In an example arrangement of the present disclosure, when the fingerprint pressing area is not pressed, the image display pixel emits light. When the fingerprint pressing area is pressed, the image display pixel and the fingerprint recognition pixel simultaneously emit light.

In an example arrangement of the present disclosure, when the fingerprint pressing area is not pressed, the image display pixel in the fingerprint pressing area is driven to emit light. When the fingerprint pressing area is pressed, the image display pixel and the fingerprint recognition pixel located in the fingerprint pressing area are driven to emit light simultaneously.

In an example arrangement of the present disclosure, when the fingerprint pressing area is not pressed, each sub-pixel in the fingerprint pressing area is driven to emit light according to a brightness corresponding to an image to be displayed. When the fingerprint pressing area is pressed, each sub-pixel in the fingerprint pressing area is driven to emit light with increased brightness.

In an example arrangement of the present disclosure, when the fingerprint pressing area is not pressed, each sub-pixel in the fingerprint pressing area is driven to emit light according to a brightness corresponding to an image to be displayed. When the fingerprint pressing area is pressed, the red sub-pixel and/or the green sub-pixel in the fingerprint pressing area is driven to emit light with increased brightness, and the blue sub-pixel does not emit light.

In an example arrangement of the present disclosure, when the fingerprint pressing area is not pressed, each sub-pixel in the fingerprint pressing area is driven to emit light according to a brightness corresponding to an image to be displayed. When the fingerprint pressing area is pressed, each the sub-pixel in the fingerprint pressing area is driven to display white color in the fingerprint pressing area.

According to a third aspect of the present disclosure, a display device is provided, including the fingerprint recognition panel described above.

It should be understood that the above general description and the following detailed description are merely example and explanatory and should not be construed as limiting of the disclosure.

This section provides an overview of various implementations or examples of the techniques described in the present disclosure, which is not a comprehensive disclosure of the full scope or all features of the disclosed technology.

BRIEF DESCRIPTION OF THE DRAWINGS

The accompanying drawings, which are incorporated in the specification and constitute a part of the specification, show example arrangements of the present disclosure. The drawings along with the specification explain the principles of the present disclosure. It is apparent that the drawings in the following description show only some of the arrangements of the present disclosure, and other drawings may be obtained by those skilled in the art without departing from the drawings described herein.

DETAILED DESCRIPTION

Example arrangements will now be described more fully with reference to the accompanying drawings. However, the arrangements can be implemented in a variety of forms and should not be construed as being limited to the examples set forth herein; rather, these arrangements are provided so that this disclosure will be more complete so as to convey the idea of the example arrangements to those skilled in this art. The described features, structures, or characteristics in one or more arrangements may be combined in any suitable manner. In the following description, numerous specific details are set forth to provide a full understanding of the arrangements of the present disclosure. However, one skilled in the art will appreciate that the technical solutions of the present disclosure can be practiced when one or more of the described specific details may be omitted or other methods, components, devices, steps, etc. may be employed. In other instances, well-known technical solutions are not shown or described in detail to avoid obscuring aspects of the present disclosure.

The terms "one", "a", "the" and "said" are used to indicate the presence of one or more elements/components, etc.; the terms "include" and "have" are used to indicate an open type meaning of including and means that there may be additional elements/components/etc. in addition to the listed elements/components/etc.; the terms "first" and "second" are used as labels only, not a limitation on the number of objects.

In addition, the drawings are merely schematic representations of the present disclosure and are not necessarily drawn to level. The same reference numerals in the drawings denote the same or similar parts, and the repeated description thereof will be omitted. Some of the block diagrams shown in the figures are functional entities and do not necessarily correspond to physically or logically separate entities.

FIGS. 1A-1D illustrate fingerprint recognition methods in accordance with a comparative example of the present disclosure, and FIGS. 1A-1D are separately described below.

Figure 1:
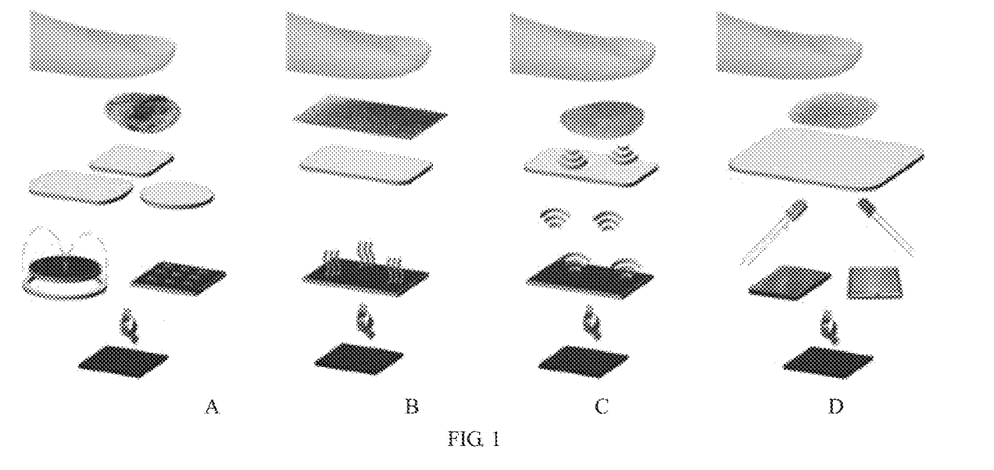
FIG. 1 is a schematic structural diagram showing fingerprint recognition in the related art.

FIG. 1A shows a schematic structural diagram of capacitive fingerprint recognition. The recognition and unlocking speed of the capacitive fingerprint sensor is currently very satisfactory. It takes only 0.15-0.2 seconds from the time of attaching the finger to entering the main screen, and almost no waiting time is felt, but when the distance between the finger and the sensor electrode is 300 µm or more, the amount of capacitance signal is very small, and signal reading cannot be performed when a screen module is positioned between the finger and the sensor electrode.

FIG. 1B is a schematic structural view showing thermal fingerprint recognition. The thermal sensor can sense the temperature change of the finger surface, and the fake finger or the broken finger cannot pass the recognition, but it needs to consume more energy, and the imaging is not clear in the hot environment or in the hot weather.

FIG. 1C is a schematic structural diagram showing ultrasonic fingerprint recognition. The ultrasonic fingerprint recognition is not affected by dirt that may exist on the finger, and provides a more stable and accurate method for fingerprint recognition under the screen, but the medium of the display area is extensive, there is no better solution for the time being.

FIG. 1D shows a schematic structural diagram showing optical fingerprint recognition. The penetrating power of the light is strong, therefore the fingerprint recognition under the screen can be well realized.

Figure 2:
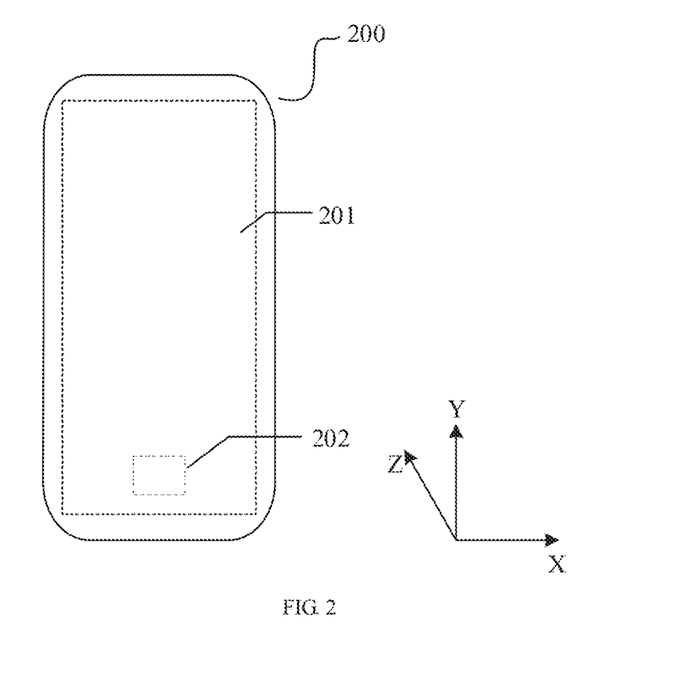
FIG. 2 is a schematic structural diagram showing an optical fingerprint recognition device in the related art.

FIG. 2 is a schematic structural diagram of a pressure sensitive fingerprint recognition panel under screen according to an arrangement of the present disclosure. As shown in FIG. 2, the pressure sensitive fingerprint recognition panel under screen 200 includes a display screen 201 and a fixed recognition area 202, and the fixed recognition area 202 is located on the display screen 201 and is adjacent to the lower side of the display screen 201. The fingerprint is identified by contacting the finger with the fixed recognition area 202.

Figure 3:
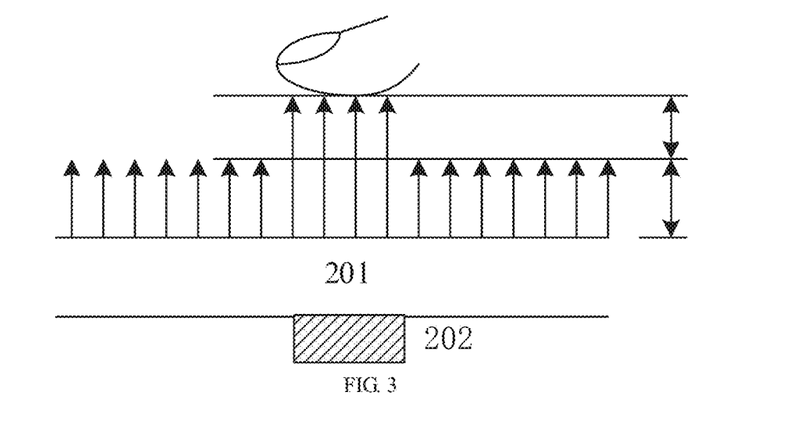
FIG. 3 shows an optical path diagram of optical fingerprint recognition in the related art.

FIG. 3 shows an optical path diagram of fingerprint recognition. As shown in FIG. 3, a fingerprint pressing area is disposed on the display screen 201, and there is a certain distance between the fingerprint pressing surface and the upper surface of the display screen 201. The fixed recognition area 202 and the fingerprint pressing area is oppositely disposed, being located on the lower surface of the display 201. When the finger is in contact with the fingerprint pressing area, pressure sensing can be generated on the fingerprint pressing surface, and after the fixed recognition area 202 receives the pressure sensing, the fingerprint is recognized. However, the optical fingerprint recognition technology will affect the accuracy of fingerprint recognition when the screen brightness is not high. In order to improve the accuracy of fingerprint recognition, it is necessary to make the brightness of the screen as high as possible the moment that the fingerprint is recognized, which requires the overall brightness of the screen to be improved, but the luminescent material in the screen (such as the organic luminescent material in the OLED screen) will age with long-term use of the screen, resulting in a decrease in brightness. Higher brightness will result in faster aging, thus the display effect is affected.

Figure 4:
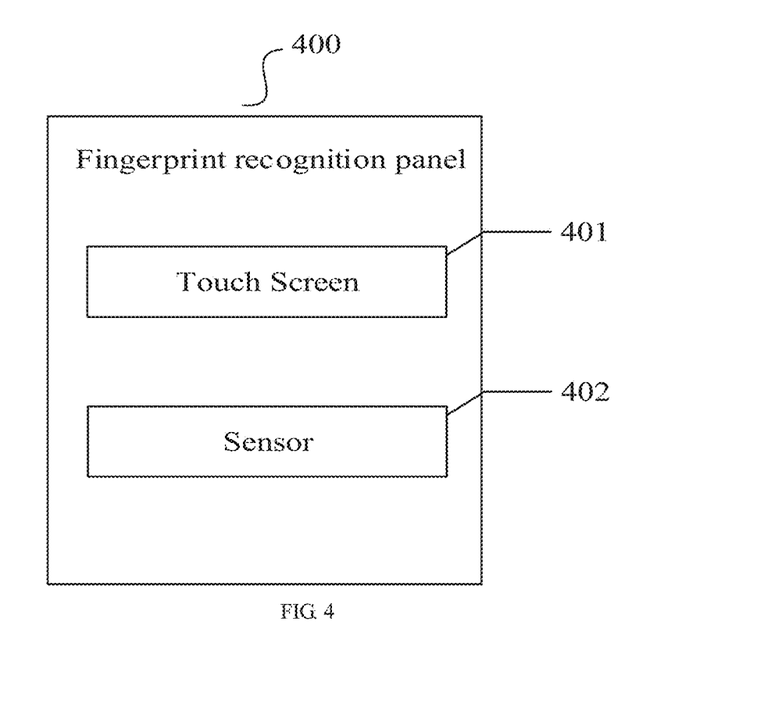
FIG. 4 is a schematic structural diagram showing a fingerprint recognition panel in an example arrangement of the present disclosure.

An example arrangement of the present disclosure provides a fingerprint recognition panel, and FIG. 4 shows a schematic structural diagram of a fingerprint recognition panel 400, including a touch screen 401 and a sensor 402. The touch screen 401 includes at least one fingerprint pressing area D; the sensor 402 is located below the touch screen 401 and is configured to send a driving signal to the touch screen 401 when a press is detected in the fingerprint pressing area D, so that the brightness of the pixel corresponding to the fingerprint pressing area D in the touch screen 401 is increased.

The fingerprint recognition panel in the present disclosure adopts an optical fingerprint recognition technology to facilitate the fingerprint recognition under the screen, and sends a driving signal by the sensor when the fingerprint touches the fingerprint pressing area on the touch screen, and drives the brightness of the pixel corresponding to the fingerprint pressing area in the touch screen to increase, thus improving the accuracy of fingerprint recognition, and also preventing screen aging, further enhancing the user experience.

Figure 5:
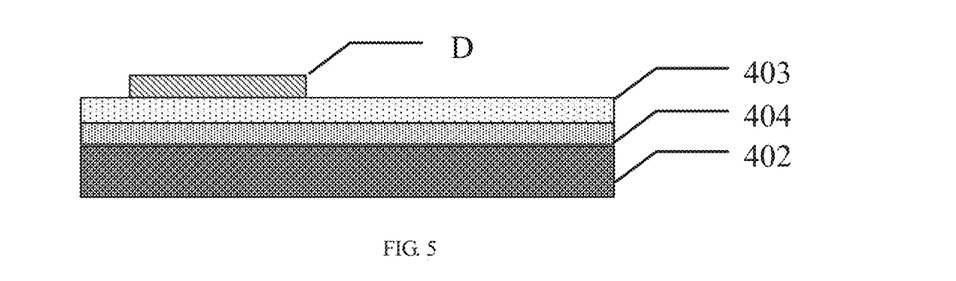
FIG. 5 is a schematic structural diagram showing a fingerprint recognition panel in an example arrangement of the present disclosure.

In an example arrangement of the present disclosure, FIG. 5 illustrates a structural diagram of a touch screen. The touch screen 401 includes a screen layer 403 and a pixel layer 404, and the pixel layer 404 is located between the screen layer 403 and the sensor 402. When the finger is in contact with the fingerprint pressing area D, the sensor 402 can detect the finger and output a driving signal to the pixel layer 404. The pixel corresponding to the fingerprint pressing area D in the pixel layer 404 is increased in brightness by the driving signal. The brightness of the light that is irradiated to the fingerprint is increased, and the accuracy of fingerprint recognition is greatly improved. The screen layer 403 may be formed of a transparent material for contacting with a finger, so that light emitted by each pixel in the pixel layer 404 is transmitted to the finger and reflected by the finger to the sensor 402 to realize recognition of the fingerprint.

In an example arrangement of the present disclosure, the brightness of the pixel may be increased by increasing the gray level of at least a portion of the sub-pixels included in the pixel. The gray level represents a level between the brightest brightness and the darkest brightness of the display, so as to control the brightness of the screen by the input signal. For example, in an 8-bit image, a sub-pixel in a pixel corresponding to the fingerprint pressing area D has a gray level of 120 and a corresponding brightness of 300 nits, when the finger touches the fingerprint pressing area D, the sensor 402 detects the pressing signal, and sends the driving signal to the touch screen 401 to drive the sub-pixels in the pixel corresponding to the fingerprint pressing area D to increase its gray scale to 200, and correspondingly, the pixel brightness is increased to 500 nits, so that the brightness of the light that incidents on the fingerprint is increased to improve the accuracy of fingerprint recognition instantly upon touching of the finger.

In an example arrangement of the present disclosure, it is also possible to increase the brightness of a pixel by changing the color of the pixel display. For example, by changing the brightness ratio of the sub-pixels, the pixels can be made to display a color having a higher brightness. For example, the pixel corresponding to the fingerprint pressing area D displays red color (i.e., only the red sub-pixel emits light), and when the finger touches the fingerprint pressing area D, the sensor 402 detects the pressing signal, and sends a driving signal to the touch screen 401 to drive the color of the pixel corresponding to the fingerprint pressing area D to change to green (only the green sub-pixel emits light) or white (all sub-pixels emit light), so that the screen layer 403 corresponding to the fingerprint pressing area D presents a green image or a white image to increase the brightness of the light that is irradiated to the fingerprint the moment the finger contacts, and improves the accuracy of fingerprint recognition. It is of course also possible to change the color of the pixel to other pixels having high brightness, which is not specifically limited in the present disclosure. In one arrangement of the present disclosure, considering that blue light accounts for a small proportion of white light luminance, and the lifetime of the blue sub-pixel is generally the worst, changing the color of the pixel display may include the blue sub-pixel in the area corresponding to the fingerprint pressing area D is made not to emit light, thus appearing green (only green sub-pixel emitting light), yellow (i.e., red sub-pixel and green sub-pixel simultaneously emitting light) or red (only red sub-pixels emitting light). For example, the area D before the pressing may display blue, and after the sensor 402 detects the pressing signal, the driving signal is sent to the touch screen 401 to drive the blue color displayed in the position corresponding to the fingerprint pressing area D to turn green.

Figure 6:
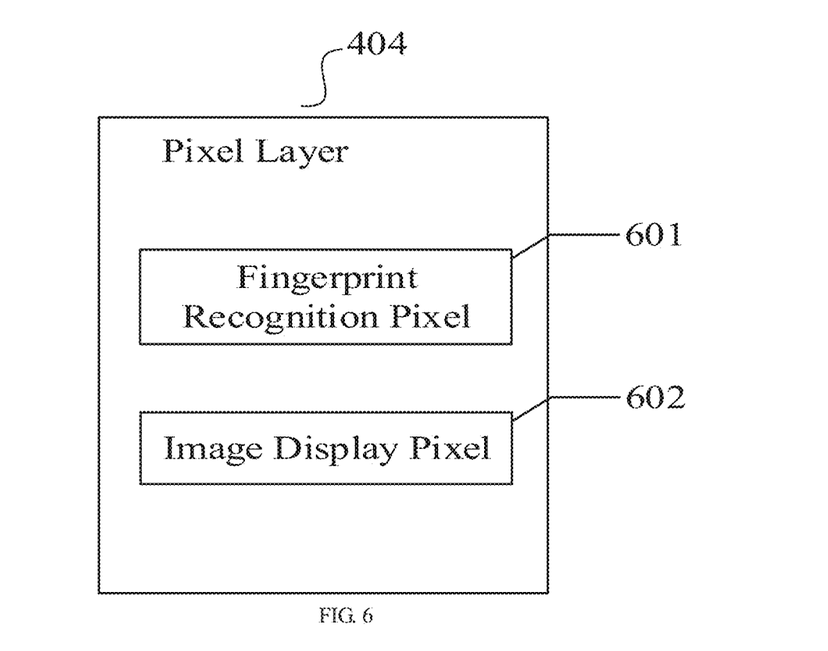
FIG. 6 is a schematic structural diagram showing a pixel layer in an example arrangement of the present disclosure.

In an example arrangement of the present disclosure, FIG. 6 shows a schematic structural diagram of a pixel layer. As shown in FIG. 6, the pixel layer 404 includes a fingerprint recognition pixel 601 and an image display pixel 602, and the fingerprint recognition pixel 601 and the fingerprint pressing area D are disposed correspondingly. When the fingerprint pressing area D is not pressed, the image display pixel 602 emits light under the control driving of the control signal and the data signal to present a corresponding image on the display screen; when the fingerprint pressing area D has a pressing, the image display pixel 602 and the fingerprint recognition pixel 601 emit light at the same time, the image display pixel 602 emits light for displaying an image, and the fingerprint recognition pixel 601 emits light to improve the brightness of the fingerprint portion, thus improving the accuracy of the fingerprint recognition without affecting the normal image display. And also solves the problem of screen aging caused by fingerprint recognition under the screen.

In an example arrangement of the present disclosure, the fingerprint recognition pixel 601 may be one or more of a red sub-pixel, a green sub-pixel, and a blue sub-pixel, or may be one or more of a red sub-pixel, a green sub-pixel, a blue sub-pixel, and a white pixel. Since the brightness of the green sub-pixel is high, the fingerprint recognition pixel 601 preferably adopts a green sub-pixel; and the image display pixel 602 may be a plurality of red sub-pixels, green sub-pixels, blue sub-pixels, or may be a plurality of red sub-pixels, green sub-pixels, blue sub-pixels and white sub-pixels.

In addition, the present disclosure may form fingerprint recognition pixel 601 and/or image display pixels 602 by arranging filters of different colors on a white light source to emit light of different colors. For example, the fingerprint recognition pixel 601 may be formed by disposing one or more of a red filter, a green filter, and a blue filter on the white light source to emit red, green, and blue light, or by disposing one or more of a red filter, a green filter, a blue filter and a transparent filter on a white light source.

Figure 7:
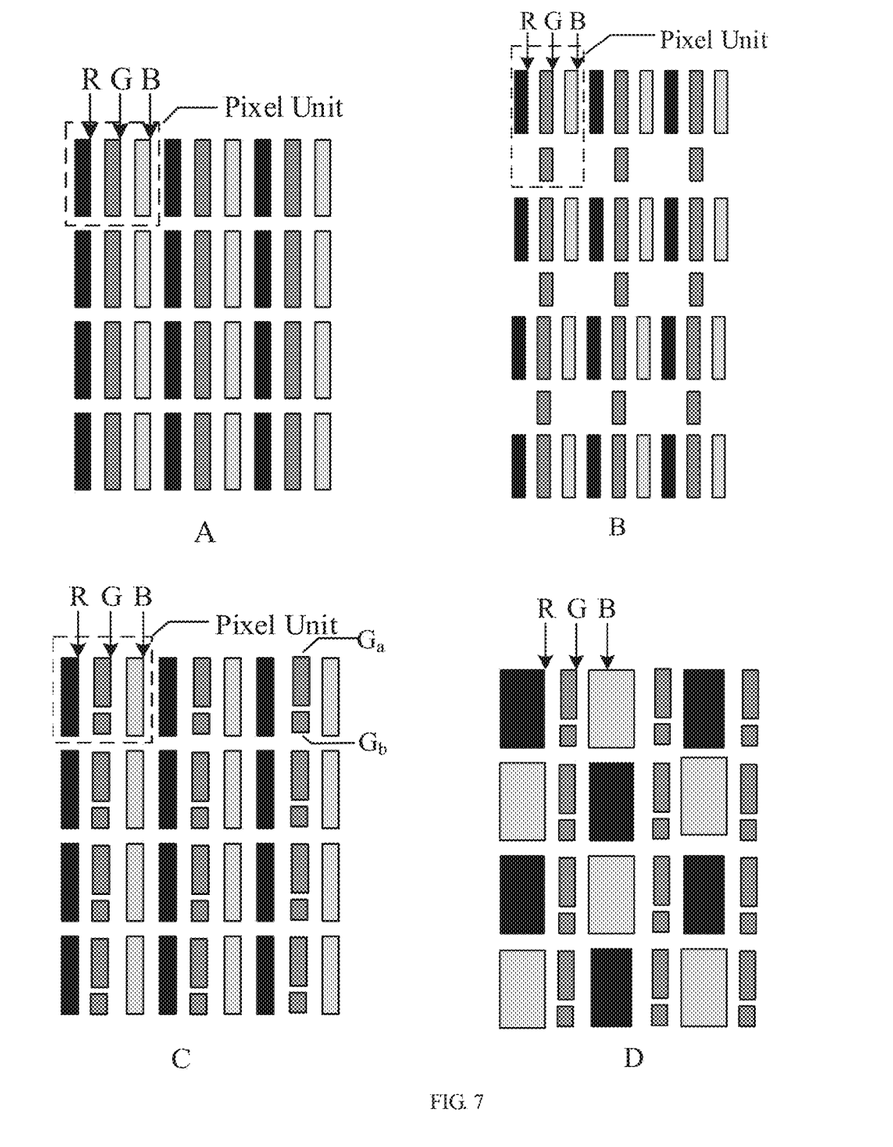
FIG. 7 is a schematic diagram showing arrangement of pixels in an example arrangement of the present disclosure.

In the example arrangement of the present disclosure, the fingerprint recognition pixel 601 and the image display pixel 602 are arranged according to a certain regularity. The present disclosure describes the arrangement of the pixels by taking the fingerprint recognition pixel 601 as a green sub-pixel as an example. FIGS. 7A-7D are schematic diagrams showing the structure of four pixel distributions. The image display pixel 602 includes red, green, and blue sub-pixels arranged in sequence, and the red, green, and blue sub-pixels and the fingerprint recognition pixel 601 form a pixel unit, and a plurality of the pixel units may be arranged in an array. As shown in FIG. 7A, the sub-pixels of the three colors of RGB are sequentially arranged. The green sub-pixels may be the fingerprint recognition pixel 601 or the image display pixel 602; as shown in FIG. 7B, the plurality of fingerprint recognition pixel 601 are located on one side of the image display pixel 602 and are arranged coaxially with the sub-pixels of the image display pixel 602 having the same color; for example, the fingerprint recognition pixel 601 is a green sub-pixel, and the fingerprint recognition pixel 601 is arranged coaxially with the green sub-pixels in the image display pixel 602; in order to improve the resolution, the pixel arrangement may be made compact. As shown in FIG. 7C, the fingerprint recognition pixel 601 may be nested in the image display pixel 602. The green sub-pixels are divided into two parts, $G_a$ and $G_b$. The red pixel, the green sub-pixel $G_a$, the blue sub-pixel constitute the image display pixel 602, and the green sub-pixel $G_b$ serves as the fingerprint recognition pixel 601. The green sub-pixels $G_b$ are nested in the image display pixels and arranged coaxially with the green sub-pixels $G_a$. As shown in FIG. 7D, the fingerprint recognition pixel 601 and the image display pixels 602 can also be arranged in a pentile arrangement manner, and the adjacent image display pixels shares one sub-pixel, and the fingerprint recognition pixel 601 is coaxially arranged with the sub-pixels of the image display pixel 602 having the same color. For example, the green fingerprint recognition pixel 601 is coaxially arranged with the green sub-pixel in the image display pixel 602. In addition, the fingerprint recognition pixel 601 and the image display pixel 602 may be arranged in an irregular pixel arrangement or other arrangement manner to improve the accuracy of fingerprint recognition, which is not described herein again.

Figure 8:
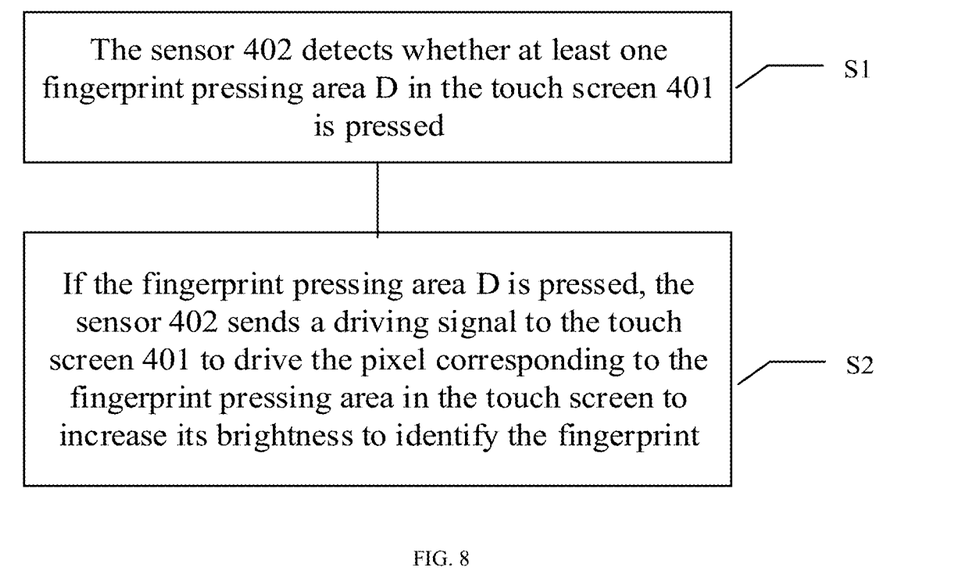
FIG. 8 is a flowchart showing a fingerprint recognition method in an example arrangement of the present disclosure.

In an example arrangement of the present disclosure, a fingerprint recognition method is also provided, and FIG. 8 shows a specific process of the method:

In S1, the sensor 402 detects whether at least one fingerprint pressing area D in the touch screen 401 is pressed;

In S2, if the fingerprint pressing area D is pressed, the sensor 402 sends a driving signal to the touch screen 401 increase the brightness of the pixel corresponding to the fingerprint pressing area in the touch screen to recognize the fingerprint.

In an example arrangement of the present disclosure, the touch screen 401 includes a screen layer 403 and a pixel layer 404, and the pixel layer 404 is located between the screen layer 403 and the sensor 402, and meanwhile the pixel layer 404 includes a fingerprint recognition pixel 601 and an image display pixel 602. When the fingerprint pressing area D is not pressed, the image display pixel 602 emits light; when the fingerprint pressing area D is pressed, the image display pixel 602 and the fingerprint recognition pixel 601 emit light at the same time. Through the fingerprint recognition method of the present disclosure, the fingerprint recognition does not affect the normal display of the image, and the accuracy of the fingerprint recognition is improved, the screen aging caused by the fingerprint recognition under the screen is prevented, and the user experience is further improved.

Figure 9:
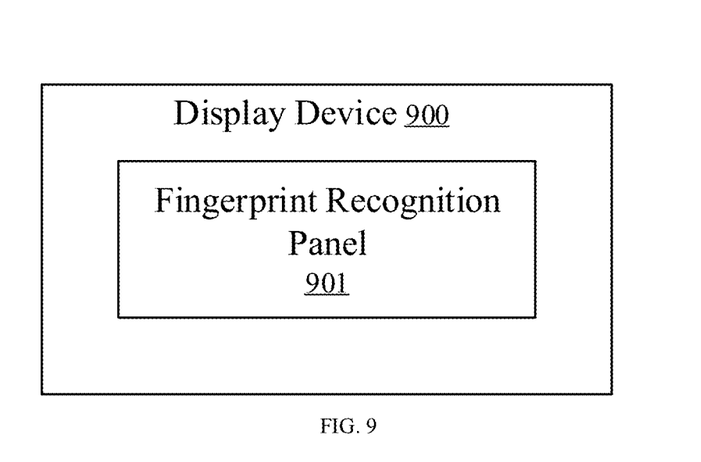
FIG. 9 is a block diagram showing a structure of a display device in an example arrangement of the present disclosure.

A display device is also provided in the present example arrangement. As shown in FIG. 9, the display device 900 includes a fingerprint recognition panel 901. The fingerprint recognition panel 901 is the fingerprint recognition panel in the present disclosure, and the display device 900 can be any product or component having a display function, such as an electronic paper, an OLED display, a mobile phone, a tablet computer, a television, a notebook computer, a digital photo frame, a navigator, and the like.

It can be seen from the above technical solutions that the fingerprint recognition panel, the fingerprint recognition method and the display device in the example arrangements of the present disclosure have at least some of the following improvements:

The fingerprint recognition panel in the present disclosure includes a touch screen and a sensor. The touch screen includes at least one fingerprint pressing area. When the fingerprint pressing area is pressed, the sensor sends a driving signal to the touch screen, so that the brightness of a pixel corresponding to the fingerprint pressing area in the touch screen is increased. By increasing the brightness of the screen, the accuracy of fingerprint recognition under the screen is improved, and the screen is prevented from aging caused by high brightness for a long time. In addition, by dividing the pixel into a fingerprint recognition pixel and an image display pixel, both the fingerprint recognition pixel and the image display pixel emit light during fingerprint recognition; in the absence of fingerprint recognition, only the image display pixel emits light, so that fingerprint recognition does not affect normal display, further improving the accuracy of fingerprint recognition, and preventing the screen aging and improving the user experience.

Other arrangements of the present disclosure will be apparent to those skilled in the art. The present application is intended to cover any variations, uses, or adaptations of the present disclosure, which are in accordance with the general principles of the present disclosure and include common general knowledge or conventional technical means in the art that are not disclosed in the present disclosure. The specification and arrangements are illustrative, and the real scope and spirit of the present disclosure is defined by the appended claims.

It is to be understood that the present disclosure is not limited to the precise structures that have been described above and shown in the drawings, and various modifications and changes can be made without departing from the scope thereof. The scope of the present disclosure is to be limited only by the appended claims.

What is claimed is:

1. A fingerprint recognition panel, comprising:
   a touch screen, comprising at least one fingerprint pressing area;
   a sensor, located below the touch screen, and configured to detect a press in the fingerprint pressing area, and send a driving signal to the touch screen in response to the press, to increase brightness of a pixel corresponding to the fingerprint pressing area in the touch screen,
   wherein increasing brightness of the pixel comprises changing a color displayed by the pixel, and wherein a brightness of blue sub-pixels of the pixel is reduced and brightness of at least one of red sub-pixels or green sub-pixels is increased in response to the press,
   wherein the touch screen comprises a screen layer and a pixel layer, and the pixel layer is located between the screen layer and the sensor,
   wherein the pixel layer comprises a fingerprint recognition pixel and an image display pixel, and the fingerprint recognition pixel is disposed corresponding to the fingerprint pressing area,
   wherein the image display pixel comprises red sub-pixels, green sub-pixels and blue sub-pixels arranged in sequence, and the red sub-pixels, the green sub-pixels and the blue sub-pixels and the fingerprint recognition pixel form a pixel unit, and a plurality of the pixel units are arranged in array, and
   wherein the fingerprint recognition pixel is located on a side of the image display pixel, and is coaxially arranged with sub-pixels of same color in the image display pixel.

2. The fingerprint recognition panel according to claim 1, wherein increasing brightness of the pixel comprises increasing a gray level of at least a portion of sub-pixels comprised in the pixel.

3. The fingerprint recognition panel according to claim 1, wherein changing a color displayed by the pixel comprises changing the color displayed by the pixel to display white color in the fingerprint pressing area.

4. The fingerprint recognition panel according to claim 1, wherein the fingerprint recognition pixel is configured to emit light in response to the press.

5. The fingerprint recognition panel according to claim 1, wherein the fingerprint recognition pixel is a green sub-pixel.

6. The fingerprint recognition panel according to claim 1, wherein the fingerprint recognition pixel is one or more of the red sub-pixels, the green sub-pixels, and the blue sub-pixels.

7. The fingerprint recognition panel according to claim 1, wherein the fingerprint recognition pixel is nested in the image display pixel and is coaxially arranged with sub-pixels of same color of the image display pixel.

8. The fingerprint recognition panel according to claim 1, wherein the image display pixel comprises red, green and blue sub-pixels arranged in sequence, adjacent image display pixels share one sub-pixel, and the fingerprint recognition pixel is nested in the image display pixel and are arranged coaxially with sub-pixels of same color of the image display pixel.

9. A display device, comprising the fingerprint recognition panel according to claim 1.

* * * * *